United States Patent
Berezin et al.

(10) Patent No.: US 10,771,466 B2
(45) Date of Patent: *Sep. 8, 2020

(54) THIRD-PARTY AUTHORIZATION OF ACCESS TOKENS

(71) Applicant: International Business Machines Corporation, Armonk, NY (US)

(72) Inventors: Chaya Berezin, Tel Aviv (IL); Tamir Faibish, Rishon LeTsiyon (IL); Lior Luker, Tel Aviv (IL); Nitzan Nissim, Binyamina-Giv'at Ada (IL)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/390,579

(22) Filed: Apr. 22, 2019

(65) Prior Publication Data
US 2019/0245859 A1 Aug. 8, 2019

Related U.S. Application Data

(63) Continuation of application No. 15/797,337, filed on Oct. 30, 2017.

(51) Int. Cl.
*H04L 29/06* (2006.01)
*H04L 29/08* (2006.01)

(52) U.S. Cl.
CPC ............ *H04L 63/10* (2013.01); *H04L 63/105* (2013.01); *H04L 67/20* (2013.01); *H04L 67/2814* (2013.01); *H04L 67/42* (2013.01)

(58) Field of Classification Search
CPC .......... H04L 63/10; H04L 67/20; H04L 67/42
See application file for complete search history.

(56) References Cited

U.S. PATENT DOCUMENTS

| | | | |
|---|---|---|---|
| 9,563,771 B2 | 2/2017 | Lang et al. | |
| 9,824,411 B2 | 11/2017 | Sawka | |
| 9,948,610 B2 | 4/2018 | Broadbent et al. | |
| 2011/0041140 A1 | 2/2011 | Harm et al. | |
| 2015/0089623 A1* | 3/2015 | Sondhi | H04L 63/0853 726/9 |

(Continued)

OTHER PUBLICATIONS

List of IBM Patents or Patent Applications listed as related, dated Aug. 19, 2019, 2 pages.

(Continued)

*Primary Examiner* — Mohammad A Siddiqi
(74) *Attorney, Agent, or Firm* — Yee & Associates, P.C.

(57) ABSTRACT

A method for third-party authorization is presented. A client request is received by a resource server in a computer system from a client, wherein the client request includes an access token. An introspection request for the access token based on the client request. The introspection gateway uses a third-party authorization server from a plurality of third-party authorization servers to handle the introspection request. A resource server response is received from the introspection gateway, wherein the resource server response identifies a set of scopes for the access token. A determination is made as to whether the access token has sufficient scope from the resource server response. In response to the access token having the sufficient scope, the client is granted access to the resource server.

6 Claims, 5 Drawing Sheets

(56) References Cited

U.S. PATENT DOCUMENTS

| | | | |
|---|---|---|---|
| 2015/0150109 A1* | 5/2015 | Bocanegra | H04L 63/0807 |
| | | | 726/9 |
| 2016/0180222 A1 | 6/2016 | Sierhuis et al. | |
| 2016/0277413 A1 | 9/2016 | Ajitomi et al. | |
| 2017/0329957 A1* | 11/2017 | Vepa | G06F 21/445 |
| 2018/0234464 A1 | 8/2018 | Sim et al. | |
| 2018/0288087 A1 | 10/2018 | Hidel et al. | |
| 2019/0045033 A1* | 2/2019 | Agerstam | H04L 63/10 |
| 2019/0102162 A1 | 4/2019 | Pitre et al. | |
| 2019/0132317 A1* | 5/2019 | Berezin | H04L 63/10 |

OTHER PUBLICATIONS

OAuthing: privacy-enhancing federation for the Internet of things; P Fremantle, B Aziz—2016 Cloudification of the Internet of . . . , 2016—ieeexplore.ieee.org; 2016; pp. 1-6.

Office Action, dated May 21, 2019, regarding U.S. Appl. No. 15/797,337, 15 pages.

Final Office Action, dated Oct. 24, 2019, regarding U.S. Appl. No. 15/797,337, 12 pages.

\* cited by examiner

THIRD-PARTY AUTHORIZATION OF ACCESS TOKENS

BACKGROUND

1. Field

The disclosure relates generally to an improved computer system and, more specifically, to a method, an apparatus, and a computer program product for processing authorization tokens to access a resource server.

2. Description of the Related Art

Open authorization (OAuth) is an open standard for token-based access delegation to third parties to access user information on the Internet. This architecture allows an end user's account information to be used by third-party services without exposing the user's password. With this type of access control, secure delegated access to server resources can be made on behalf of a resource owner. A process is employed for resource owners to authorize third-party access to their server resources without sharing their credentials. This process is designed to work with Hypertext Transfer Protocol (HTTP). OAuth essentially allows access tokens to be issued to third-party clients by an authorization server with the approval of the resource owner. The third-party then uses the access token to access the protected resources hosted by the resource server.

For example, an incoming request to a resource server provides the requestor access to resources if the request contains sufficient scopes. For example, when a request is received to access a resource server, OAuth access token identifies a list of scopes. This process is also referred to as introspection and is performed against the authorization server that issued the OAuth access token. In some cases, the resource server may include an internal authorization server, use an external third-party authorization server, or some combination thereof.

An external third-party authorization server could be used for a number of different reasons. For example, the security capabilities of authorization servers may differ among the different authorization server providers. For example, additional security features may be present for mobile clients. In another example, a customer may require its own authorization server for its specific security requirements.

The protocol used to introspect access tokens can be different between different third-party authorization server providers. The resource server implements the protocol use by the third-party provider for their authorization servers. This requirement can be a challenge. For example, if a new authorization provider is selected to replace an existing authorization provider or as an additional authorization provider, changing the code to support this new authorization provider may be more difficult than desired. For example, making changes in a large or legacy system may be more difficult and expensive than desired, as well as taking more time that desired.

SUMMARY

According to one embodiment of the present invention, a method for third-party authorization is presented. A client request is received by a resource server in a computer system from a client, wherein the client request includes an access token. An introspection request for the access token based on the client request, wherein the introspection gateway uses a third-party authorization server from a plurality of third-party authorization servers to handle the introspection request. A resource server response is received from the introspection gateway, wherein the resource server response identifies a set of scopes for the access token. A determination is made as to whether the access token has sufficient scope from the resource server response. In response to the access token having the sufficient scope, the client is granted access to the resource server.

According to another embodiment of the present invention, a computer system comprising a resource server running on the computer system is presented. The resource server receives a client request from a client in which the client request includes an access token. The resource server sends an introspection request to an introspection gateway, wherein the introspection request is for introspection of the access token based on the client request, and wherein the introspection gateway uses a third-party authorization server from a plurality of third-party authorization servers to handle the introspection request. The resource server receives a response from the introspection gateway, wherein the response identifies a set of scopes for the access token. The resource server determines whether the access token has sufficient scope from a resource server response. The client is granted access to the resource server in response to the access token having the sufficient scope.

According to yet another embodiment of the present invention, a computer program product for third-party authorization is presented. The computer program product comprises a computer-readable storage media, wherein first program code, second program code, third program code, fourth program code, and fifth program code are stored. The first program code receives a client request from a client, wherein the client request includes an access token. The second program code sends an introspection request for the access token based on the client request, wherein the introspection gateway uses a third-party authorization server from a plurality of third-party authorization servers to handle the introspection request. The third program code receives a response from the introspection gateway, wherein the response identifies a set of scopes for the access token. The fourth program code determines whether the access token has sufficient scope from the response. The fifth program code grants the client access to a resource server in response to the access token having the sufficient scope.

DETAILED DESCRIPTION

Figure 1:
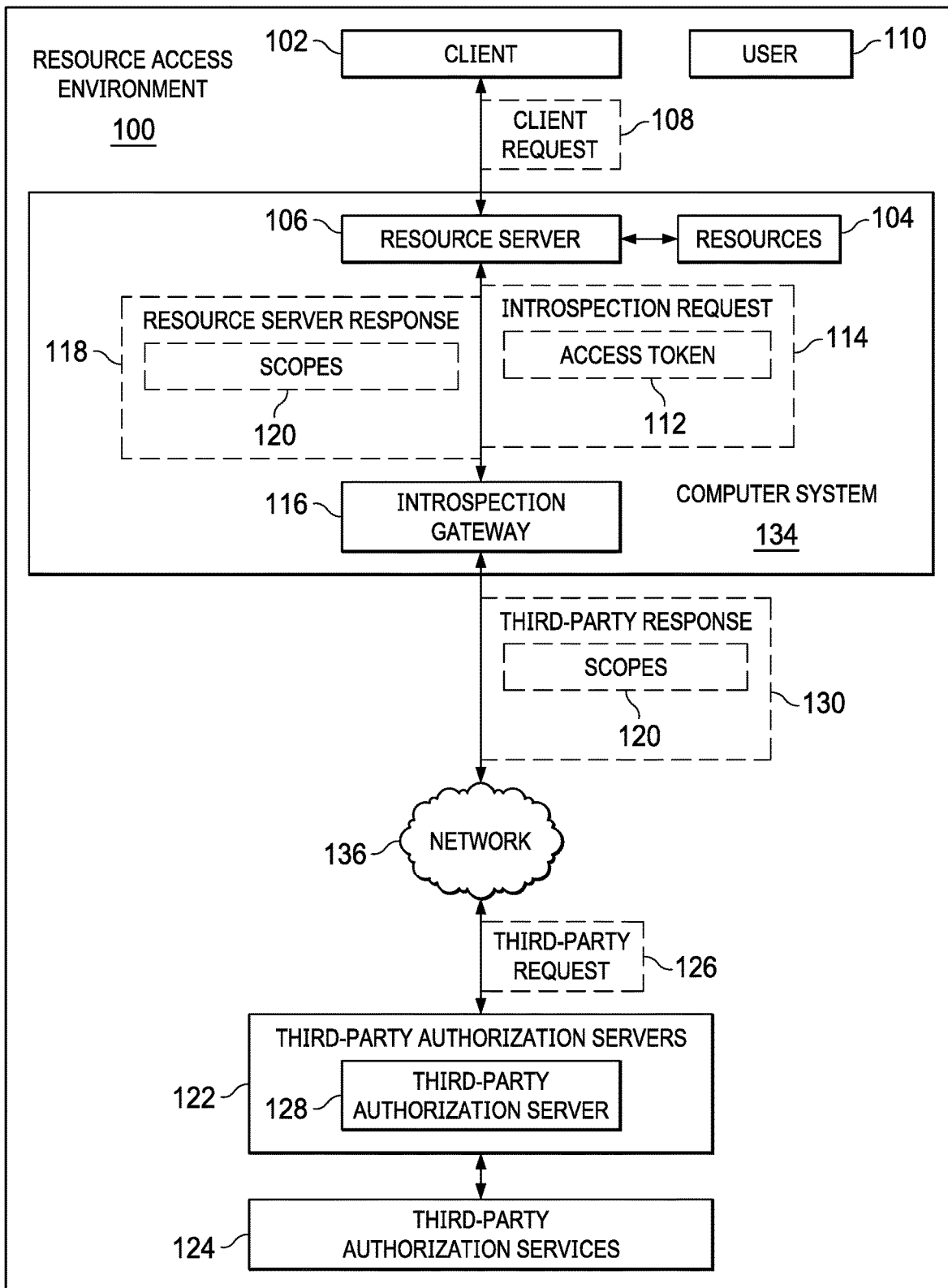
FIG. 1 is a block diagram of a token introspection environment in accordance with an illustrative embodiment.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account that it would be desirable to have a method, an apparatus, and a computer program product that overcome a problem with changing authorization service providers, as well as possibly other problems. The illustrative embodiments provide a method, an apparatus, and a computer program product for accessing resources using third-party authorization. In one illustrative example, a method is present for third-party authorization. A resource server in the computer system receives a client request from a client, wherein the client request includes an access token. The resource server sends an introspection request to an introspection gateway for the access token based on the client request, wherein the introspection gateway uses a third-party authorization server from a plurality of third-party authorization servers to handle the introspection request. The resource server response is received from the introspection gateway, wherein the response identifies a set of scopes for the access. A determination is made as to whether the access token has a sufficient scope from the response. Responsive to the access token having the sufficient scope, the resource server grants the client access to the resource server.

With reference now to the figures and, in particular, with reference to FIG. 1, a block diagram of a token introspection environment is depicted in accordance with an illustrative embodiment. As depicted in resource access environment 100, client 102 can access resources 104 through resource server 106 using token introspection. In this illustrative example, client 102 may have limited resource access to resources 104. Client 102 can take a number of different forms. For example, client 102 may be a desktop application, a web application, a mobile application, or some other suitable type of client.

Resources 104 can be, for example, at least one of a document, a spreadsheet, a webpage, a social media service, a social networking service, a bank account, or some other type of resource. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, client 102 can send client request 108 to resource server 106 over network 136. Network 136 may take a number of different forms. For example, network 136 is selected from at least one of a local area network, a wide area network, an intranet, the Internet, or some other suitable type of network.

Client request 108 is a request for access to resources 104 without user 110 providing a password to client 102. This access may be, for example, reading, changing, or writing information in resources 104. For example, client request 108 may be a request to obtain information for user 110.

In this illustrative example, client 102 has access token 112, which is used in lieu of a password. Access token 112 contains information that can be used to provide client 102 permissions or privileges to access resource server 106 and in turn access resources 104.

For example, access token 112 can contain security credentials for a login session and identify a user, user groups, user privileges, a particular application, or other suitable types of information. In this illustrative example, access token 112 is an OAuth token. This token and other processes, such as those for introspection of the OAuth token, can be implemented under the standard OAuth 2.0 published as RFC 6749.

As depicted, resource server 106 receives client request 108 from client 102 in which client request 108 includes access token 112. Resource server 106 sends introspection request 114 to introspection gateway 116. In this illustrative example, resource server 106 and introspection gateway 116 can be implemented in software, hardware, or some combination thereof.

Introspection request 114 is for introspection of access token 112 in which introspection request 114 is based on client request 108. Introspection gateway 116 and resource server 106 are located in computer system 134. Computer system 134 is a physical hardware system and includes one or more data processing systems. When more than one data processing system is present, those data processing systems are in communication with each other using a communications medium. The communications medium may be a network. For example, the network may be selected from at least one of a local area network, a wide area network, Internet, the Internet, or some other suitable type of network. The data processing systems may be selected from at least one of a computer, a mobile device, see a workstation, a server computer, a tablet, or some other suitable data processing system. In this illustrative example, resource server 106 and introspection gateway 116 are depicted to be on computer system 134. In other illustrative examples, these components may be located on different computer systems.

Resource server 106 receives resource server response 118 from introspection gateway 116. In this illustrative example, resource server response 118 identifies a set of scopes 120 for access token 112. The set of scopes 120 is identified as part of the introspection process in this illustrative example.

As used herein, "a set of," when used with respect to items, means one or more items. In other words, "a set of scopes 120" is one or more of scopes 120. In this illustrative example, a scope in scopes 120 is a client permission. In other words, the scope defines what type of access that client 102 can have based on access token 112.

Resource server 106 also determines whether access token 112 has sufficient scope from the set of scopes 120 in resource server response 118, and grants client 102 access to resource server 106 in response to access token 112 having sufficient scope.

In this illustrative example, introspection gateway 116 delegates introspection of access token 112 to one of third-party authorization servers 122 for third-party authorization services 124. In this illustrative example, introspection gateway 116 and third-party authorization servers 122 for third-party authorization services 124 are in communication with each other over network 136.

As depicted, introspection gateway 116 is a single introspection endpoint for resource server 106. Introspection gateway 116 selects third-party authorization server 128 from a plurality of third-party authorization servers 122 to handle introspection request 114. Introspection gateway 116 also determines a protocol for third-party authorization server 128 and converts introspection request 114 into third-party request 126 used by third-party authorization server 128 in third-party authorization servers 122 to introspect access token 112 using the protocol identified.

Introspection gateway 116 sends third-party request 126 to third-party authorization server 128 and, in response, receives third-party response 130 from third-party authorization server 128. Introspection gateway 116 converts third-party response 130 into resource server response 118 and sends resource server response 118 to resource server 106. In addition to containing a set of scopes 120, resource server response 118 also can contain other information such as an indication of whether access token 112 is active.

In this manner, resource server 106 uses introspection gateway 116 as a single introspection endpoint for resource server 106. As a result, the introspection of the access token 112 is delegated to third-party authorization services 124 by introspection gateway 116. This delegation is performed in a manner that is transparent to resource server 106. Further, as changes are made to third-party authorization services 124, changes such as recoding resource server 106 is unnecessary. As third-party authorization services 124 are changed to add, remove, or change third-party authorization servers 122, changes can be made to introspection gateway 116 to communicate with third-party authorization servers 122. In the illustrative examples, the manner in which introspection gateway 116 communicates with resource server 106 does not change when changes are made to third-party authorization servers 122.

One or more solutions are present in one or more illustrative examples that overcome a problem with changing authorization service providers. As a result, one or more of the illustrative examples may provide a technical effect providing a single introspection endpoint for a resource server in which introspection of an access token is delegated to third-party authorization services by the introspection gateway.

As a result, computer system 134 operates as a special purpose computer system in which introspection gateway 116 in computer system 134 enables delegating processing of access tokens received from resource servers. In particular, introspection gateway 116 transforms computer system 134 into a special purpose computer system as compared to currently available general computer systems that do not have introspection gateway 116.

Figure 2:
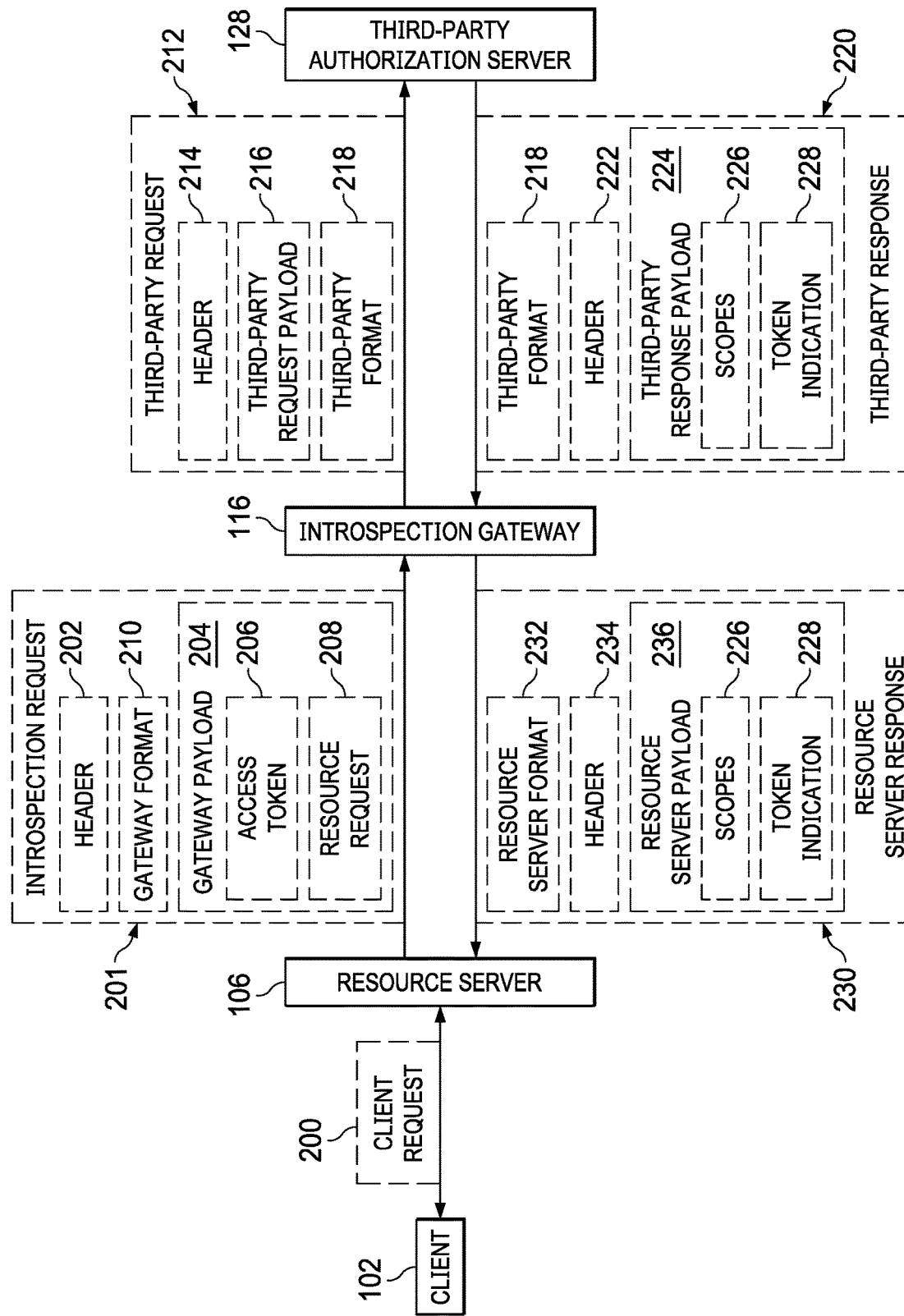
FIG. 2 is a data flow diagram for handling a client request to access to a resource in accordance with an illustrative embodiment.

With reference to FIG. 2, a data flow diagram for handling a client request to access a resource is depicted in accordance with an illustrative embodiment. In the illustrative examples, the same reference numeral may be used in more than one figure. This reuse of a reference numeral in different figures represents the same element in the different figures.

As depicted, client request 200 is received from client 102 by resource server 106. Client request 200 is an example of client request 108 in FIG. 1. Resource server 106 sends introspection request 201 to introspection gateway 116. Introspection request 201 is an example of introspection request 114 in FIG. 1.

As depicted, introspection request 201 comprises header 202 and gateway payload 204. Header 202 contains information used to route introspection request 201 to introspection gateway 116. A payload is the part of the transmitted data that is the intended message and excludes headers or metadata sent to facilitate the delivery of the payload. In this illustrative example, gateway payload 204 includes access token 206 and resource request 208. Introspection request 201 is in gateway format 210 which is recognized and used by introspection gateway 116.

In this example, introspection gateway 116 selects third-party authorization server 128 to introspect access token 206. With this selection, introspection gateway 116 identifies the protocol used by third-party authorization server 128. Introspection gateway 116 converts introspection request 201 into third-party request 212.

As depicted, third-party request 212 comprises header 214 and third-party request payload 216. Third-party request 212 has third-party format 218. Header 214 is utilized to route third-party request 212 to third-party authorization server 128. Third-party request payload 216 is in a format utilized by third-party authorization server 128.

In the illustrative example, third-party authorization server 128 returns third-party response 220. In this illustrative example, third-party response 220 also has third-party format 218 recognized by introspection gateway 116 in this illustrative example. As depicted, third-party response 220 comprises header 222 and third-party response payload 224. Third-party response payload 224 comprises a set of scopes 226 and token indication 228. The set of scopes 226 identifies resources that can be accessed by the client. Token indication 228 indicates whether access token 206 is active.

In turn, introspection gateway 116 converts third-party response 220 into resource server response 230, which has resource server format 232 utilized by resource server 106. Resource server response 230 is an example of resource server response 118 in FIG. 1.

Resource server response 230 comprises header 234 and resource server payload 236. Header 234 is utilized to route resource server response 230 to resource server 106. Resource server payload 236 contains a set of scopes 226 and token indication 228 in resource server format 232. Resource server response 230 is sent to resource server 106.

Thus, resource server 106 only needs to know the protocol to communicate with introspection gateway 116. Introspection gateway 116 uses protocols to communicate with third-party authorization servers 122 for third-party authorization services 124. As a result, introspection gateway 116 can be updated to take into account changes to third-party authorization services 124 without needing changes to resource server 106.

The illustrations of resource access environment 100 is depicted in FIG. 1 and FIG. 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, resource server 106 and introspection gateway 116 are shown as separate components in this illustrative example. In other illustrative examples, resource server 106 and introspection gateway 116 can be located in the same data processing system. As another example, one or more resource servers can be present in resource access environment 100 in addition to or in place of resource server 106. These resource servers also can send introspection requests to introspection gateway 116. In another illustrative example, one or more introspection gateways may be present in addition to or in place of introspection gateway 116. These introspection gateways also may see requests from one or more resource servers.

Figure 3:
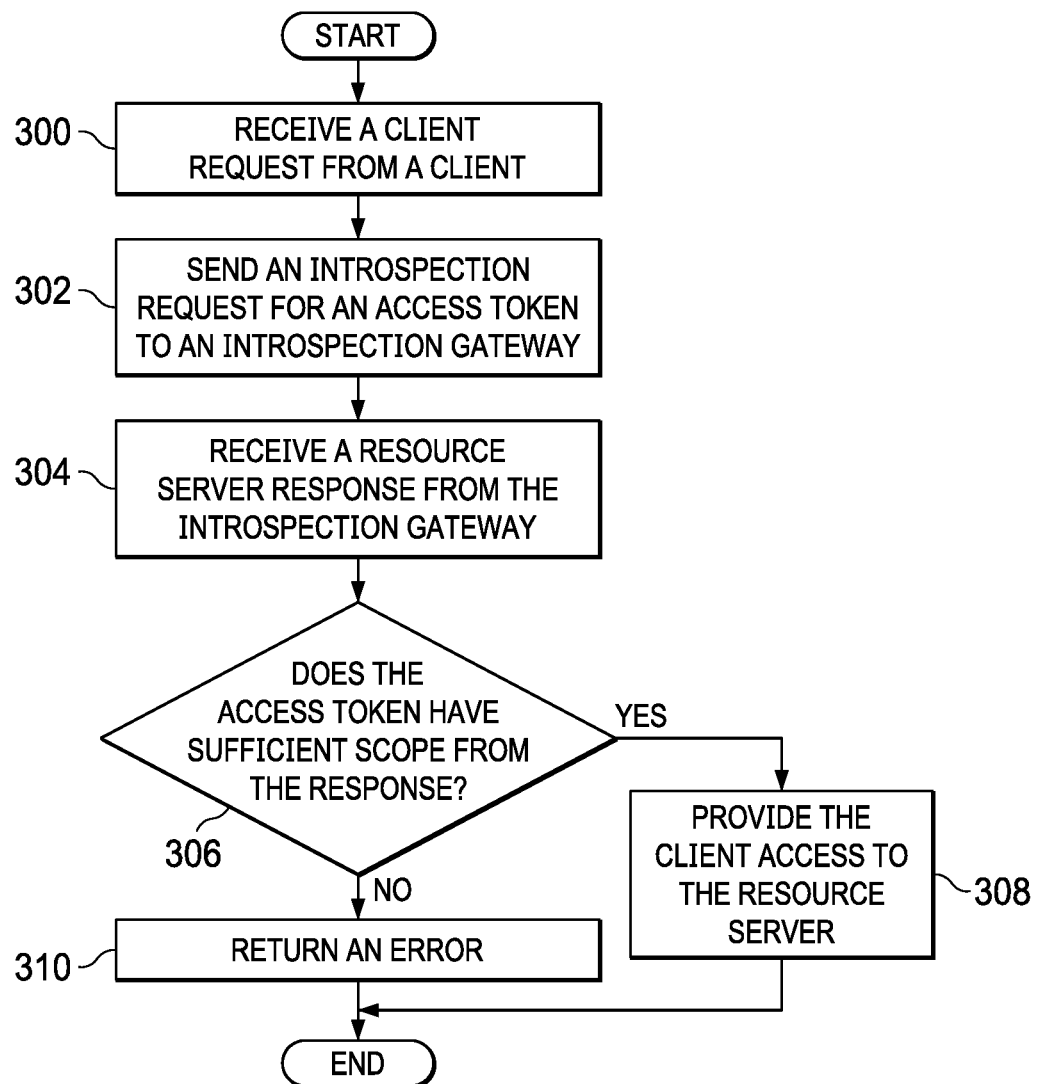
FIG. 3 is a flowchart of a process for third-party authorization to access a resource server in accordance with an illustrative embodiment.

Turning next to FIG. 3, a flowchart of a process for third-party authorization to access a resource server is depicted in accordance with an illustrative embodiment. The process illustrated in FIG. 3 can be implemented in resource server 106 in FIG. 1. The process begins by receiving a client request from a client (step 300). The client request includes an access token. Further, the request can include a request to perform an action. This request can be, for example, an OAuth request to access information on a website or some other resource on a network, such as the Internet. If the request is to access a bank server, the request may include requests to perform some action that requires a privilege to a resource in addition to containing the access token. The access may be for a resource such as account balance, transfer money, or some other resource at the bank server.

The process sends an introspection request for an access token to an introspection gateway (step 302). The introspection request is based on the client request. The process receives a resource server response from the introspection gateway (step 304). The response identifies a set of scopes for the access.

A determination is made as to whether the access token has sufficient scope from the response (step 306). Responsive to a determination that the access token has sufficient scope, the process provides the client access to the resource server (step 308). The process terminates thereafter.

Otherwise, the process returns an error (step 310), with the process terminating thereafter without granting access to the resource server. For example, the request is to access the resource for transfer money any set of scopes does not include this resource, then an error is returned.

Figure 4:
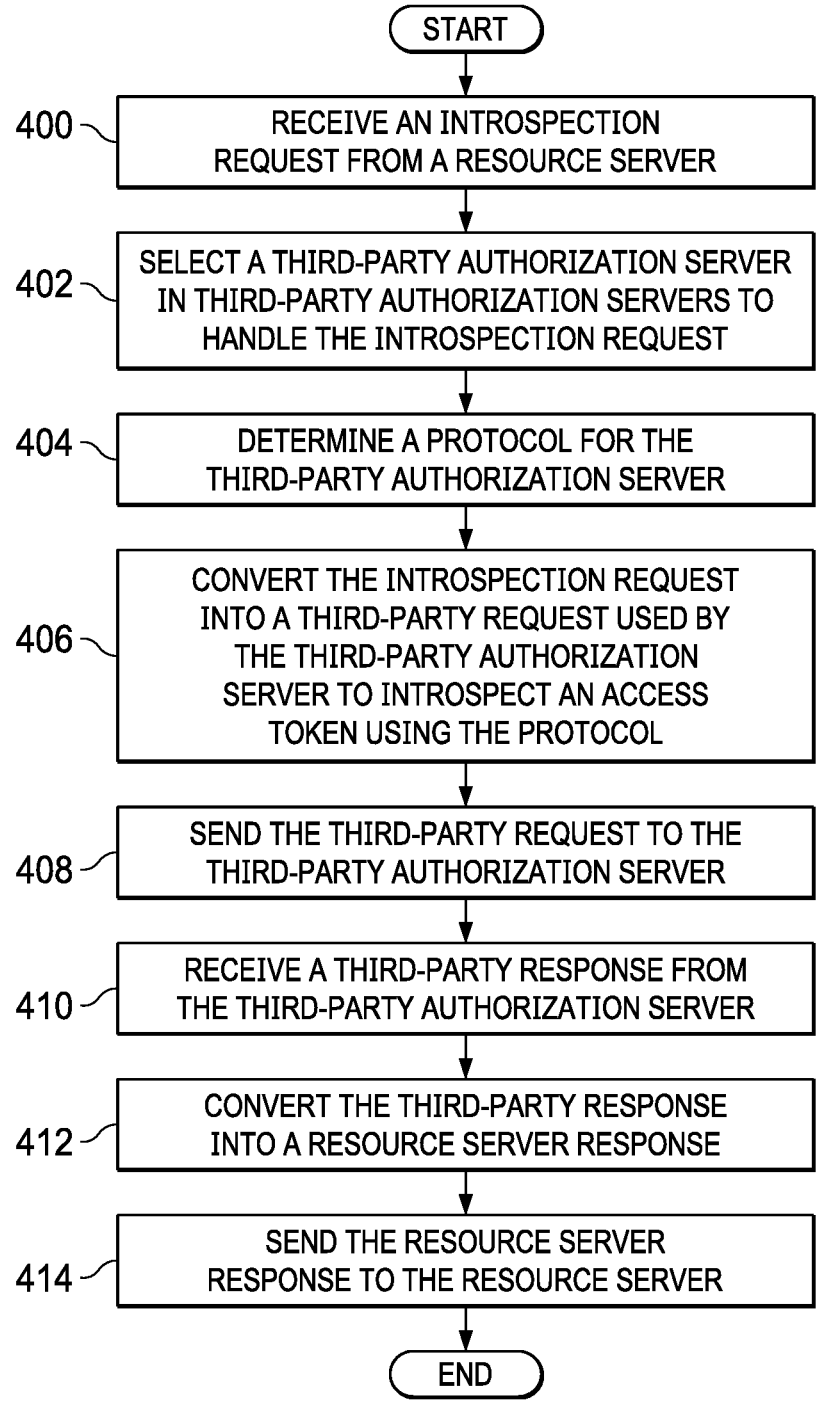
FIG. 4 is a flowchart of a process for delegating introspection of an access token in accordance with an illustrative embodiment.

With reference next to FIG. 4, a flowchart of a process for delegating introspection of an access token is depicted in accordance with an illustrative embodiment. The process illustrated in FIG. 2 can be implemented in introspection gateway 116 in FIG. 1.

The process begins by receiving an introspection request from a resource server (step 400). This request is in a format utilized by an introspection gateway such that the introspection gateway functions as a single introspection endpoint for the resource server. As depicted, the request from the resource server contains the type of OAuth Server. This information can be present in the resource server for each resource. The process selects a third-party authorization server in third-party authorization servers to handle the introspection request (step 402).

The process determines a protocol for the third-party authorization server (step 404). The process converts the introspection request into a third-party request used by the third-party authorization server to introspect an access token using the protocol (step 406). The process sends the third-party request to the third-party authorization server (step 408).

The process receives a third-party response from the third-party authorization server (step 410). The process converts the third-party response into a resource server response (step 412). The process sends the resource server response to the resource server (step 414), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 5:
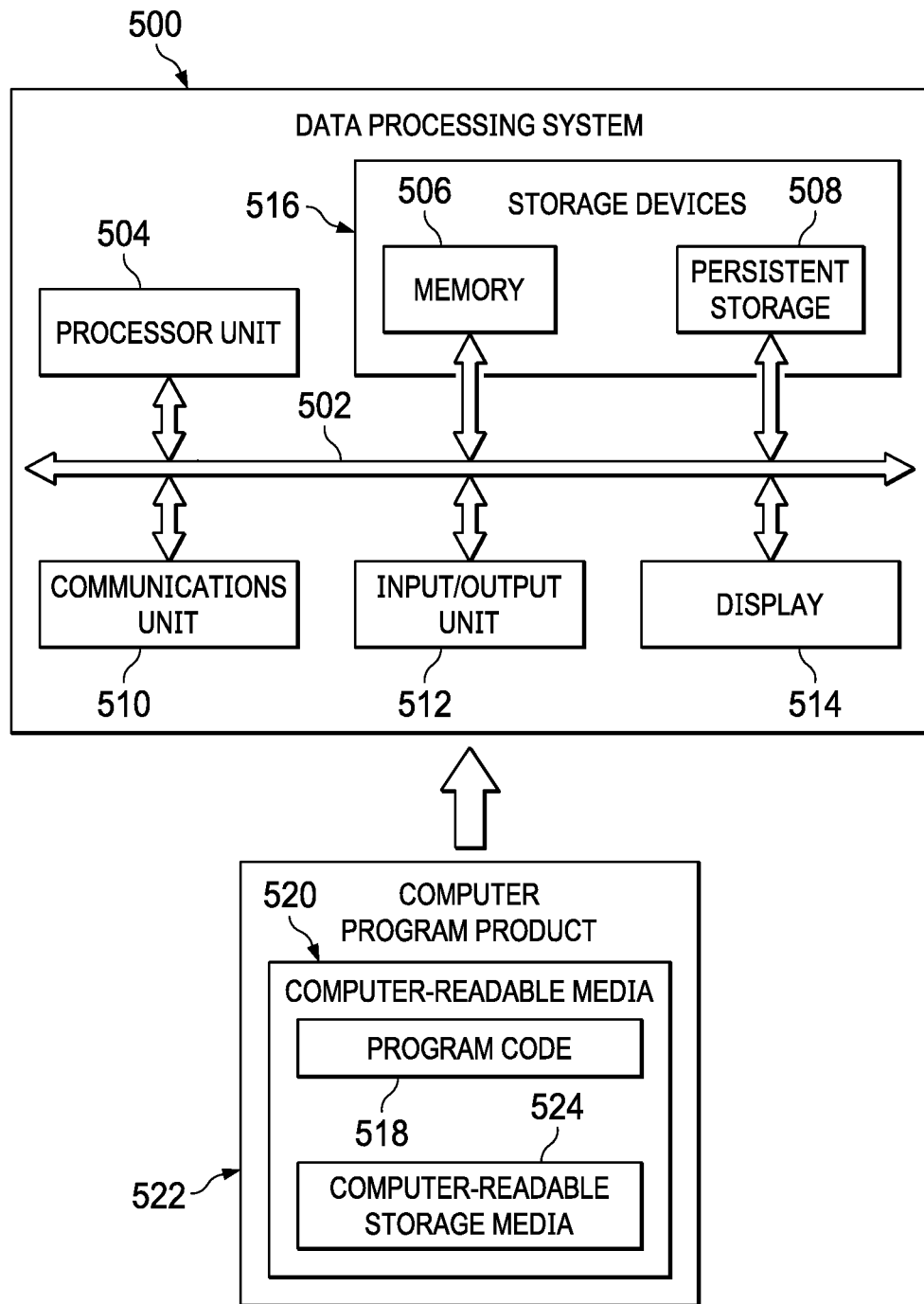
FIG. 5 is a block diagram of a data processing system in accordance with an illustrative embodiment.

Turning now to FIG. 5, a block diagram of a data processing system is depicted in accordance with an illustrative embodiment. Data processing system 500 may be used to implement computer system 134, resource server 106, introspection gateway 116, or third-party authorization servers 123, including third-party authorization server 128 as shown in FIG. 1.

In this illustrative example, data processing system 500 includes communications framework 502, which provides communications between processor unit 504, memory 506, persistent storage 508, communications unit 510, input/output (I/O) unit 512, and display 514. In this example, communications unit 510 may take the form of a bus system.

Processor unit 504 serves to execute instructions for software that may be loaded into memory 506. Processor unit 504 may be a number of processors, a multi-processor core, or some other type of processor, depending on the particular implementation.

Memory 506 and persistent storage 508 are examples of storage devices 516. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 516 may also be referred to as computer-readable storage devices in these illustrative examples. Memory 506, in these examples, may be, for example, a random-access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a solid state hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these illustrative examples, provides for communications with other data processing systems or devices. In these illustrative examples, communications unit 510 is a network interface card.

Input/output unit 512 allows for input and output of data with other devices that may be connected to data processing system 500. For example, input/output unit 512 may provide a connection for user input through at least one of a keyboard, a mouse, or some other suitable input device. Further, input/output unit 512 may send output to a printer. Display 514 provides a mechanism to display information to a user.

Instructions for at least one of the operating system, applications, or programs may be located in storage devices 516, which are in communication with processor unit 504 through communications framework 502. The processes of the different embodiments may be performed by processor unit 504 using computer-implemented instructions, which may be located in a memory, such as memory 506.

These instructions are referred to as program code, computer usable program code, or computer-readable program code that may be read and executed by a processor in processor unit 504. The program code in the different embodiments may be embodied on different physical or computer-readable storage media, such as memory 506 or persistent storage 508.

Program code 518 is located in a functional form on computer-readable media 520 that is selectively removable and may be loaded onto or transferred to data processing system 500 for execution by processor unit 504. Program code 518 and computer-readable media 520 form computer program product 522 in these illustrative examples. In the example, computer-readable media 520 is computer-readable storage media 524.

In these illustrative examples, computer-readable storage media 524 is a physical or tangible storage device used to store program code 518 rather than a medium that propagates or transmits program code 518. Alternatively, program code 518 may be transferred to data processing system 500 using a computer-readable signal media. The computer-readable signal media may be, for example, a propagated data signal containing program code 518. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown. The different embodiments may be implemented using any hardware device or system capable of running program code 518.

Thus, the illustrative examples provide a computer implemented method, a computer system, and a computer program product for third-party authorization. In one illustrative example, a resource server runs on a computer system. The resource server receives a client request from a client in which the client request includes an access token. The resource server sends an introspection request to an introspection gateway, wherein the request is introspection of the access token based on the client request, wherein the introspection gateway uses a third-party authorization server from a plurality of third-party authorization servers to handle the introspection request. The resource server receives a response from the introspection gateway. The response identifies a set of scopes for the access. A determination is made as to whether the access token has sufficient scope from the resource server response. The resource server grants the client access to the resource server in response to the access token having sufficient scope.

In this manner, a resource server can use an introspection gateway as a single introspection endpoint for the resource server. As a result, the introspection of access tokens is delegated to third-party authorization services by the introspection gateway. This delegation is performed in a manner that is transparent to resource server. Further, as changes are made to the third-party authorization services, changes such as recoding or patching resource servers are unnecessary.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for third-party authorization, the method comprising:
   receiving, by a resource server in a computer system, a client request from a client, wherein the client request includes an access token;
   sending, by the resource server, to an introspection gateway, an introspection request for the access token based on the client request, wherein the introspection gateway uses a third-party authorization server from a plurality of third-party authorization servers to handle the introspection request;
   selecting, by the introspection gateway, the third-party authorization server from the plurality of third-party authorization servers to handle the introspection request;
   determining a protocol for the third-party authorization server;
   converting the introspection request into a third-party request used by the third-party authorization server to introspect the access token using the protocol;
   receiving a resource server response from the introspection gateway, wherein the resource server response identifies a set of scopes for the access token;
   determining whether the access token has sufficient scope from the resource server response; and
   responsive to the access token having the sufficient scope, granting the client access to the resource server.

2. The method of claim 1 further comprising:
   sending the third-party request to the third-party authorization server;
   receiving a third-party response from the third-party authorization server;
   converting the third-party response into the resource server response; and sending the resource server response to the resource server.

3. The method of claim 1, wherein converting the introspection request into the third-party request used by the third-party authorization server comprises:
converting a payload in the introspection request into a format used by the third-party authorization server.

4. The method of claim 1, wherein the resource server response comprises the set of scopes and an indication of whether the access token is active.

5. The method of claim 1, wherein the resource server uses the introspection gateway as a single introspection endpoint for the resource server in which introspection of the access token is delegated to third-party authorization services by the introspection gateway.

6. The method of claim 1, wherein the access token is an OAuth token.

\* \* \* \* \*